US012113954B2

(12) United States Patent
Nistico

(10) Patent No.: US 12,113,954 B2
(45) Date of Patent: Oct. 8, 2024

(54) PROCESSING OF SIGNALS USING A RECURRENT STATE ESTIMATOR

(71) Applicant: APPLE INC., Cupertino, CA (US)

(72) Inventor: Walter Nistico, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 200 days.

(21) Appl. No.: 17/401,672

(22) Filed: Aug. 13, 2021

(65) Prior Publication Data

US 2021/0377512 A1  Dec. 2, 2021

Related U.S. Application Data

(63) Continuation of application No. PCT/US2020/023758, filed on Mar. 20, 2020.

(60) Provisional application No. 62/824,497, filed on Mar. 27, 2019.

(51) Int. Cl.
*H04N 13/279* (2018.01)
*H04N 13/271* (2018.01)
*H04N 13/293* (2018.01)
*H04N 13/296* (2018.01)

(52) U.S. Cl.
CPC ......... *H04N 13/279* (2018.05); *H04N 13/271* (2018.05); *H04N 13/293* (2018.05); *H04N 13/296* (2018.05)

(58) Field of Classification Search
CPC .. H04N 13/271; H04N 13/279; H04N 13/293; H04N 13/296
USPC ....................................................... 348/51
See application file for complete search history.

(56) References Cited

U.S. PATENT DOCUMENTS

| 2016/0320834 | A1 | 11/2016 | Lee et al. |
| 2018/0218203 | A1 | 8/2018 | Lawson et al. |
| 2019/0045173 | A1 | 2/2019 | Hicks |
| 2019/0285881 | A1 * | 9/2019 | Ilic .................... G02B 27/0093 |

FOREIGN PATENT DOCUMENTS

| EP | 3598274 A1 * | 1/2020 | ............. A61B 3/113 |
| WO | WO-2018017751 A1 * | 1/2018 | ......... G02B 27/0093 |
| WO | WO-2019099337 A1 * | 5/2019 | ............. G06T 17/00 |

(Continued)

OTHER PUBLICATIONS

European Patent Office (ISA/EP), International Search Report and Written Opinion of the International Searching Authority, International Application No. PCT/US2020/023758, 13 pages, May 19, 2020.

(Continued)

*Primary Examiner* — Behrooz M Senfi
(74) *Attorney, Agent, or Firm* — Thompson Hine LLP

(57) ABSTRACT

In one implementation, a method includes receiving pixel events output by an event sensor that correspond to a feature disposed within a field of view of the event sensor. Each respective pixel event is generated in response to a specific pixel within a pixel array of the event sensor detecting a change in light intensity that exceeds a comparator threshold. A characteristic of the feature is determined at a first time based on the pixel events and a previous characteristic of the feature at a second time that precedes the first time. Movement of the feature relative to the event sensor is tracked over time based on the characteristic and the previous characteristic.

22 Claims, 8 Drawing Sheets

(56) References Cited

FOREIGN PATENT DOCUMENTS

| WO | WO-2019147677 A1 | * | 8/2019 | ............ | G06F 18/214 |
| WO | WO-2020163662 A1 | * | 8/2020 | ......... | G02B 27/0075 |

OTHER PUBLICATIONS

Gisler, D., "Eye Tracking Using Event-Based Silicon Retina," Institute of Neuroinformatics, 29 pages, 2007.

Lichtsteiner, P. et al., "A 128x128 120dB 30mW Asynchronous Vision Sensor that Responds to Relative Intensity Change," ISSCC 2006 / Session 27 / Image Sensors / 27.9, International Solid-State Circuits Conference, San Francisco, CA, 10 pages, 2006.

Nguyen, A. et al., Real-Time 6DOF Pose Relocalization for Event Cameras with Stacked Spatial LSTM Networks, arxiv.org, Cornell University Library, Ithaca, NY, 7 pages, 2017.

Träisk, F. et al., "A comparison between the magnetic scleral search coil and infrared reflection methods for saccadic eye movement analysis," Graefe's Archive for Clinical and Experimental Ophthalmology, vol. 243, No. 8, pp. 791-797, 2005.

Wang, X. et al., "A New Type of Eye Movement Model Based on Recurrent Neural Networks for Simulating the Gaze Behavior of Human Reading," Complexity, vol. 2019, Article ID 8641074, 13 pages, 2019.

* cited by examiner

PROCESSING OF SIGNALS USING A RECURRENT STATE ESTIMATOR

TECHNICAL FIELD

The present disclosure generally relates to the field of image processing, and in particular, to techniques for processing events output by an event driven sensor using recurrent state estimation.

BACKGROUND

An event camera may include an image sensor that is referred to as a dynamic vision sensor ("DVS"), a silicon retina, an event-based sensor, or a frame-less sensor. Thus, the event camera generates (and transmits) data regarding changes in light intensity at each pixel sensor as opposed to data output by frame-based cameras regarding absolute light intensity at each pixel. Stated differently, while a frame-based camera will continue to generate (and transmit) data regarding absolute light intensity at each pixel when an illumination level of a scene disposed within its field of view remains static, an event camera will refrain from generating or transmitting data until a change in the illumination level is detected.

Some feature tracking operations utilize image data derived from pixel events output by an event driven sensor. Such feature tracking operations consume both power and computing resources in generating the image data. Moreover, in some instances deriving image data from pixel events may be computationally intensive for a feature tracker with limited computational resources. It is desirable to address these inefficiencies and otherwise improve feature tracking techniques that use event camera data.

SUMMARY

Various implementations disclosed herein relate to techniques for processing events output by an event driven sensor using recurrent state estimation. In one implementation, a method includes receiving pixel events output by an event sensor that correspond to a feature disposed within a field of view of the event sensor. Each respective pixel event is generated in response to a specific pixel within a pixel array of the event sensor detecting a change in light intensity that exceeds a comparator threshold. A characteristic of the feature is determined at a first time based on the pixel events and a previous characteristic of the feature at a second time that precedes the first time. Movement of the feature relative to the event sensor is tracked over time based on the characteristic and the previous characteristic.

In another implementation, a system includes a processor, an image pipeline, and a computer-readable storage medium, which includes instructions that upon execution by the processor cause the system to perform operations. The operations include receiving, by the image pipeline, pixel events output by an event sensor having a plurality of pixels positioned to receive light from a surface of an eye. Each respective pixel event is generated in response to a specific pixel among the plurality of pixels detecting a change in light intensity that exceeds a comparator threshold. A gaze characteristic is determined at a first time based on the pixel events and a previous gaze characteristic at a second time that precedes the first time. A gaze of the eye is tracked based on the gaze characteristic.

In another implementation, a non-transitory computer-readable storage medium stores program instructions computer-executable on a computer to perform operations. The operations include receiving pixel events output by an event sensor comprising a plurality of pixels positioned to receive light from a scene disposed within a field of view of the event sensor. Each respective pixel event is generated in response to a specific pixel within the plurality of pixels detecting a change in light intensity that exceeds a comparator threshold. A characteristic of a feature within the field of view is determined with a recurrent estimation process at a first time based on the pixel events and a previous characteristic of the feature at a second time that precedes the first time. Movement of the feature within the field of view is tracked using the characteristic.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
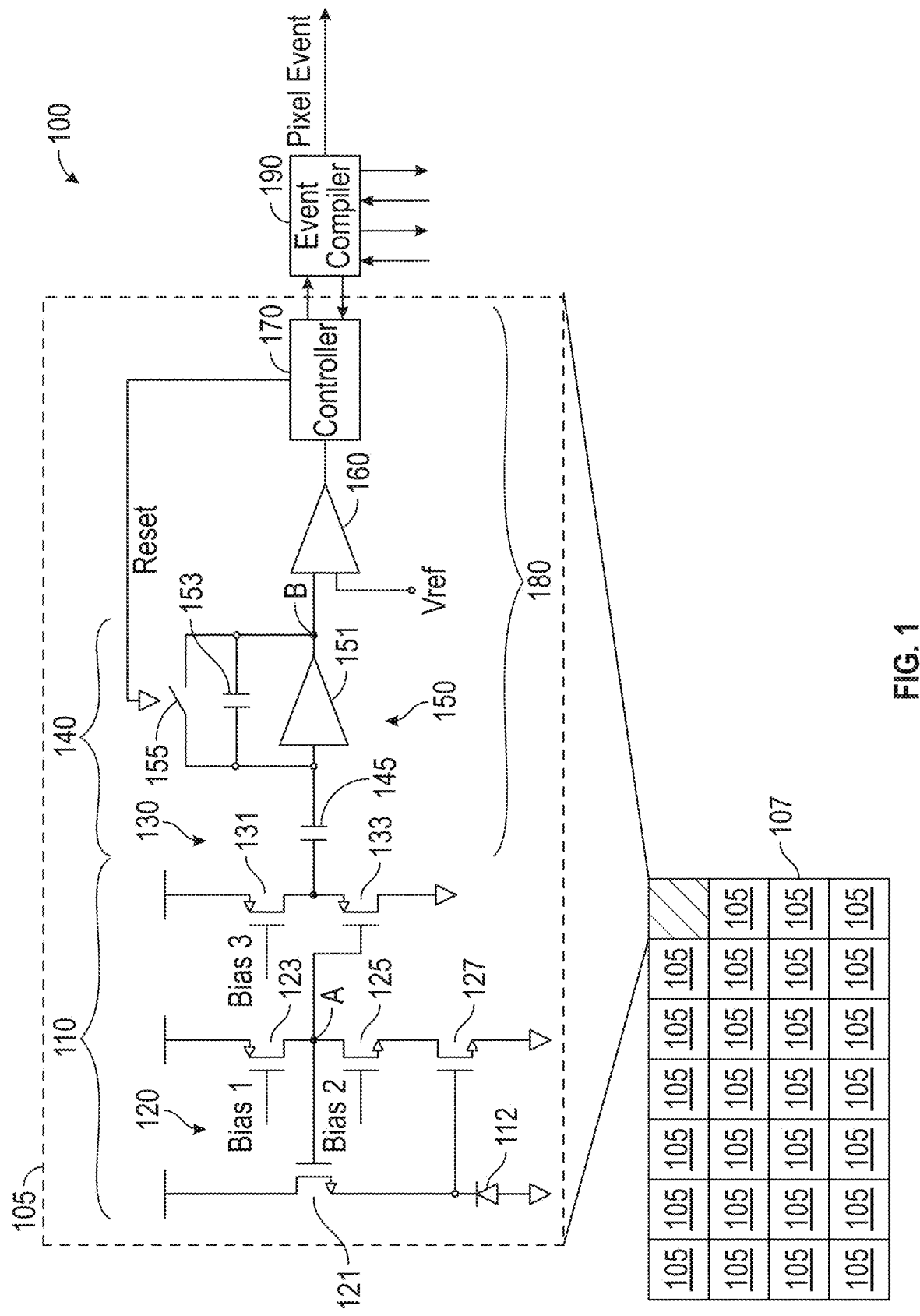
FIG. 1 illustrates a functional block diagram of an event sensor, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

A functional block diagram of an example event sensor 100 is illustrated by FIG. 1. Event sensor 100 includes a plurality of pixels 105 positioned to receive light from a scene disposed within a field of view of event sensor 100. In FIG. 1, the plurality of pixels 105 are arranged in a matrix 107 of rows and columns and, thus, each of the plurality of pixels 105 is associated with a row value and a column value. Each of the plurality of pixels 105 includes a photodetector circuit 110 and an event circuit 180.

Photodetector circuit 110 is configured to generate signals indicative of an intensity of light incident on a respective pixel 105 ("incident illumination"). To that end, photodetector circuit 110 includes a photodiode 112 configured to generate a photocurrent that is proportional to an intensity of incident illumination. The photocurrent generated by photodiode 112 flows into a logarithmic amplifier 120 formed by transistors 121, 123, 125, and 127. Logarithmic amplifier 120 is configured to convert the photocurrent into a voltage at node A with a value that is a logarithm of a value of the photocurrent. The voltage at node A is then amplified by a buffer amplifier 130 formed by transistors 131 and 133 before being applied to an input side of a differential circuit 140 of event circuit 180.

Pixel 105 further includes an event circuit 180 comprising a differencing circuit 140, a comparator 160, and a controller 170. Differencing circuit 140 is composed of alternating current ("AC") coupling capacitor 145 and switched capacitor amplifier 150. Differencing circuit 140 is configured to remove a direct current ("DC") voltage component from the voltage at node A to produce pixel data at sampling node B. By removing the DC voltage component from the voltage at node A, the pixel data at sampling node B data provides a differential value of the intensity of incident illumination detected by photodiode 112. A gain provided by amplifier 151 corresponds to a ratio defined by the respective capacitive values of AC coupling capacitor 145 to capacitor 153. Reset switch 155 is activated (i.e., transitioned from an open state to a closed state) when a reset signal is received from controller 170. By activating reset switch 155, an operating point of amplifier 151 is reset to a reference voltage associated with a threshold value of comparator 160.

Comparator 160 is configured to provide pixel-level processing of pixel data received from sample node B. To that end, comparator 160 outputs an electrical response (e.g., a voltage) when the pixel data received from sample node B indicates that photodiode 112 detected a change in an intensity of incident illumination that breaches a threshold value. Alternatively, comparator 160 refrains from outputting an electrical response when the pixel data received from sample node B indicates that photodiode 112 did not detect a change in the intensity of incident illumination that breaches the threshold value. In some instances, an electrical response output by comparator 160 is referred to as event data.

In one implementation, comparator 160 is implemented using a plurality of comparators comprising a first comparator that is configured to output an electrical response indicative of positive events (e.g., events having a positive polarity) and a second comparator that is configured to output an electrical response indicative of negative events (e.g., events having a negative polarity). In one implementation, the first comparator outputs an electrical response when the pixel data received from sample node B indicates that photodiode 112 detected a change in the intensity of incident illumination that breaches a positive threshold value. In one implementation, the second comparator outputs an electrical response when the pixel data received from sample node B indicates that photodiode 112 detected a change in the intensity of incident illumination that breaches a negative threshold value.

Controller 170 is configured to coordinate with other components of the event sensor 100 (e.g., controllers within other pixels) to communicate an event signal (e.g., a sample of event data) to an event compiler 190 for each electrical response output by comparator 160. In one implementation, reset switch 155 receives a reset signal from controller 170 each time comparator 160 obtains pixel data at sampling node B that breaches the threshold value.

Event compiler 190 receives events signals (e.g., samples of event data) from each of the plurality of pixels 105 that each represent a change in an intensity of incident illumination breaching the threshold value. In response to receiving a sample of event data from a particular pixel of the plurality of pixels 105, event compiler 190 generates a pixel event. Pixel events generated by event compiler 190 when an event signal is associated with pixel data indicative of a change in the intensity of incident illumination that breaches a positive threshold value (or voltage) may be referred to as "positive" pixel events. In one implementation, positive pixel events are pixel events with a positive polarity that represent net increases in the intensity of incident illumination that exceed a magnitude defined by the upper threshold value or voltage ("$V_{th}$"). The pixel event generated by event compiler when an event signal is associated with pixel data indicative of a change in the intensity of incident illumination that breaches a negative threshold value (or voltage) may be referred to as a "negative" pixel event. In one implementation, negative pixel events are pixel events with a negative polarity that represent net decreases in the intensity of incident illumination that exceed a magnitude defined by the lower threshold value or voltage ("$-V_{th}$").

Furthermore, event compiler 190 populates the pixel event with information indicative of an electrical response (e.g., a value or a polarity of the electrical response) included in the event signal. In one implementation, event compiler 190 also populates the pixel event with one or more of: timestamp information corresponding to a point in time at which the pixel event was generated and an address identifier corresponding to the particular pixel that sent the event signal which triggered the pixel event. A stream of pixel events including each pixel event generated by event compiler 190 may then be communicated to an image pipeline (e.g. image or video processing circuitry) (not shown) associated with event sensor 100 for further processing. In one implementation, the image pipeline may include or be associated with a pixel event processing module (e.g., pixel event processing module 1140 of FIG. 11).

As discussed above, event compiler 190 may populate each pixel event with some combination of: (i) an address identifier corresponding to a particular pixel that sent an event signal which triggered a respective pixel event (e.g., x/y-coordinates of the particular pixel—[x,y]); (ii) information indicative of an electrical response (e.g., a value or a polarity of the electrical response—"Intensity") included in the event signal; and (iii) timestamp information corresponding to a point in time ("T") at which the respective pixel event was generated. If event compiler 190 generated a number ("N") of pixel events and populated each pixel event with all three data points, those N—pixel events (pixel events 1 . . . N) could be represented as the following list of pixel events: ($[x_1,y_1]$, Intensity-$_1$, $T_1$), ($[x_2,y_2]$, Intensity-$_2$, $T_2$), . . . , ($[x_N,y_N]$, Intensity-$_N$, $T_N$).

In one implementation, event compiler 190 may omit polarity-related information from each pixel event. In this implementation, each pixel event may indicate that a photodiode of a respective pixel has detected a change in light intensity having an unspecified polarity. An example list of pixel events in accordance with this implementation could be represented as: ($[x_1,y_1]$, ($[x_2,y_2]$, $T_2$), . . . , ($[x_N,y_N]$, $T_N$).

In one implementation, pixel events generated within a pre-defined time interval (e.g., 1 milliseconds) from one another are "bundled" into a single time bin. Each bundle (or bin) of pixel events is associated with (or assigned) a common timestamp. An example list of pixel events in accordance with this implementation could be represented as: ($[x_1,y_1]$, $[x_2,y_2]$, $[x_3,y_3]$, $TG_1$), ($[x_4,y_4]$, $[x_5,y_5]$, $[x_6,y_6]$, $TG_2$), . . . ($[x_M,y_M]$, $[x_{M+1},y_{M+1}]$, $[x_{M+2},y_{M+2}]$, $TG_N$). In one implementation, reducing a periodicity associated with the pre-defined time interval reduces a bandwidth associated with the stream of pixel events.

Figure 2:
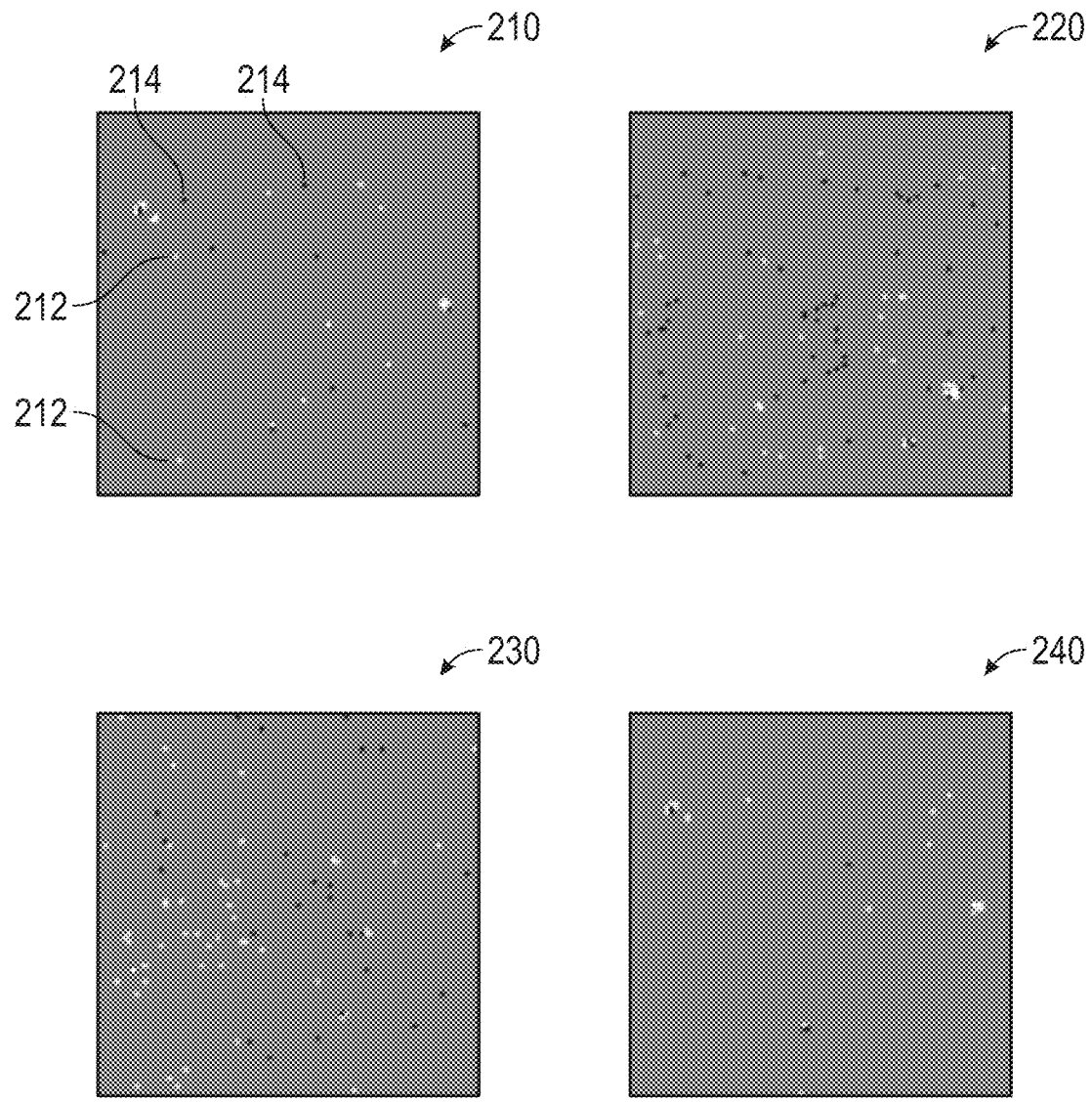
FIG. 2 illustrates example two-dimensional ("2-D") tiles of pixel events that an event sensor may output for further processing, in accordance with some implementations.

In various implementations, event compiler 190 may also output pixel events as two-dimensional ("2-D") tiles of pixel events. FIG. 2 depicts examples of such 2-D tiles of pixel events that event compiler 190 may output for further processing. In one implementation, each pixel event is mapped to a particular location of a corresponding 2-D tile of pixel events using address identifier information. In one implementation, each 2-D tile encodes a value or a polarity of an electrical response provided by each pixel event included in a corresponding bin, time interval, or subset of pixel events. By way of example, tile 210 may encode such values or polarities corresponding to pixel events generated between at a first time (time$_{-T}$) and a second time (time$_{-T-1}$) preceding the first time. In this example, tile 220 may encode such values or polarities corresponding to pixel events generated between at time$_{-T}$ and a third time (time$_{-T+1}$) subsequent to time$_{-T}$. Likewise tiles 230 and 240 may encode such values or polarities corresponding to pixel events generated between time$_{-T+1}$ and time$_{-T+2}$ and between time$_{-T+2}$ and time$_{-T+3}$, respectively. Upon receiving a particular 2-D tile (e.g., tile 210), an image pipeline or pixel event processing module (e.g., pixel event processing module 1140 of FIG. 11) may identify particular pixels that both detected positive changes in incident illumination within a given interval (e.g., pixel events 212) and negative changes in incident illumination within the given interval (e.g., pixel events 214). One skilled in the art may recognize that it is also possible to entirely omit polarity information such that each element in a given tile encodes (e.g., with a single bit) whether a change of incident illumination of any polarity has occurred on a respective pixel in that given time interval.

Figure 3:
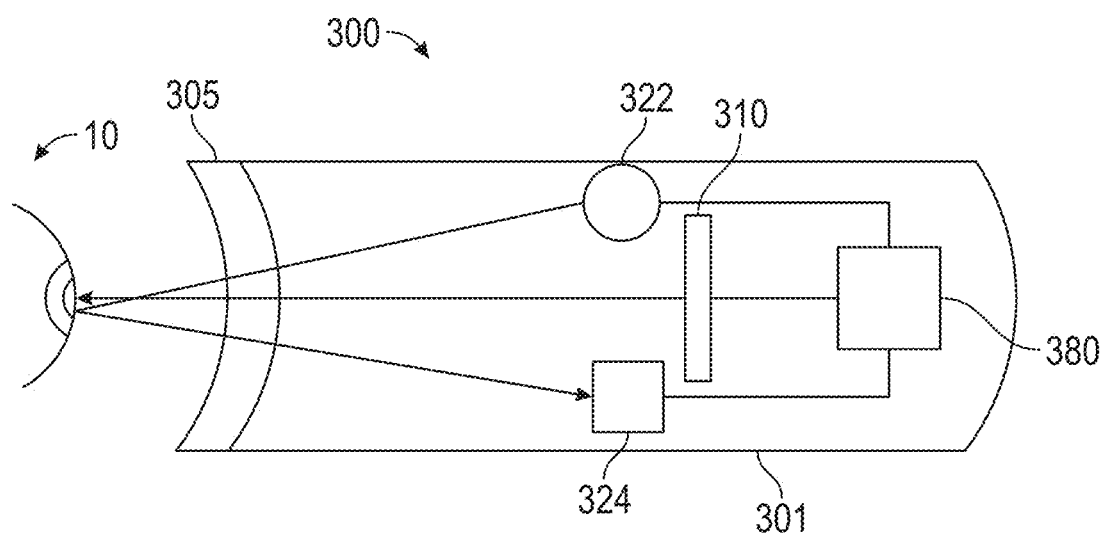
FIG. 3 is a block diagram of an example head-mounted device (HMD) in accordance with some implementations.

FIG. 3 illustrates a block diagram of a head-mounted device 300 in accordance with some implementations. Head-mounted device 300 includes a housing 301 (or enclosure) that houses various components of head-mounted device 300. Housing 301 includes (or is coupled to) an eye pad 305 disposed at a proximal end of housing 301 with respect to a user 10 of head-mounted device 300. In various implementations, eye pad 305 is a plastic or rubber piece that comfortably and snugly keeps head-mounted device 300 in the proper position on the face of the user 10 (e.g., surrounding the eye of the user 10).

In some implementations, image data is presented to the user 10 of head-mounted device 300 via a display 310 disposed within housing 301. Although FIG. 3 illustrates a head-mounted device 300 including a display 310 and an eye pad 305, in various implementations, the head-mounted device 300 does not include a display 310 or includes an optical see-through display without including an eye pad 305.

Head-mounted device 300 further includes a gaze tracking system disposed within housing 301 comprising an event sensor 324, a controller 380, and optionally one or more optical sources 322. In general, controller 380 is configured to interact with event sensor 324 and an image pipeline or a feature tracking unit (e.g., feature tracking unit 1146 of FIG. 11) associated with the image pipeline to detect and track gaze characteristics of the user 10.

In one implementation, the system includes one or more optical sources 322, which emit a light that reflects off the eye of the user 10 as a light pattern (e.g., a circle of glints) that is detected by event sensor 324. In one implementation, controller 280 is configured to activate the one or more optical sources 322 by pulsing the one or more optical sources 322 at a defined frequency (e.g., 300 Hertz). In one implementation, pulsing the one or more optical sources 322 at the defined frequency causes pixels within event sensor 324 to generate event data at a rate that is proportional to the defined frequency.

Figure 4:
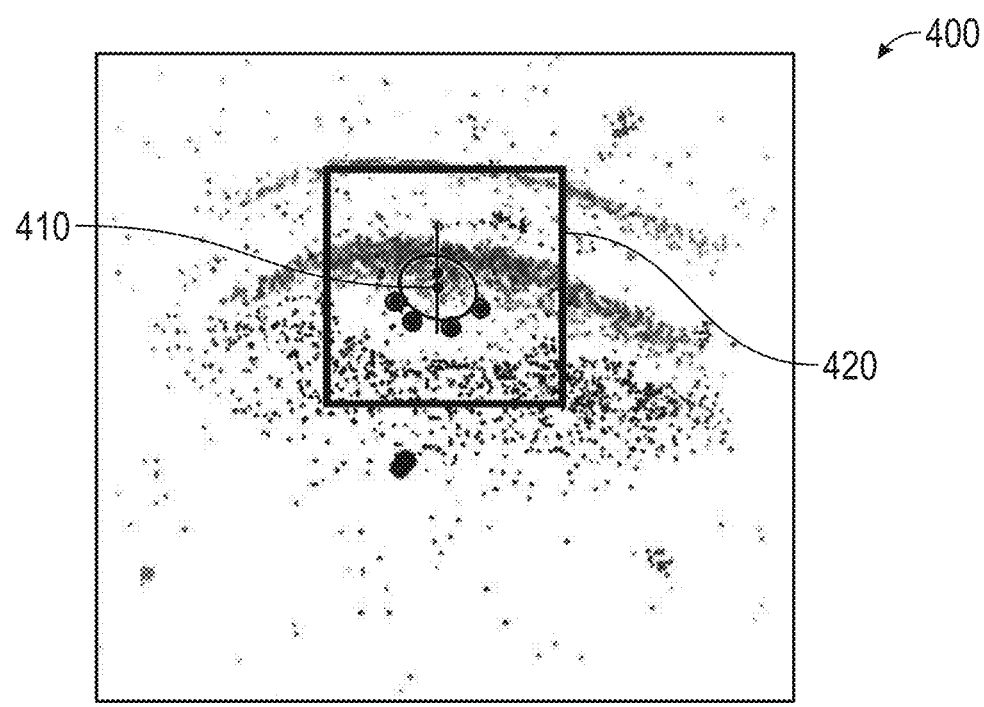
FIG. 4 illustrates an example of image data that an image pipeline derives from pixel events output by an event sensor, in accordance with some implementations.

In one implementation, no optical sources are used, and the eye is passively illuminated by ambient light. In one implementation, the image pipeline may derive image data from pixels events output by event sensor 324 to determine gaze tracking characteristics. By way of example, FIG. 4 illustrates image data 400 depicting an eye of a user that the image pipeline may derive from pixel events output by event sensor 224. Image data 400 may be provided to a feature tracker of the image pipeline to effectuate eye tracking functionality.

To that end the feature tracker may be configured to detect a gaze characteristic depicted in the image data 400 (e.g., using such techniques as SIFT, KAZE, and the like). The feature tracker may further track that gaze characteristic over time (e.g., using such techniques as a Kanade-Lucas-Tomasi tracker, a Shi-Tomasi tracker, and the like). In this example, detecting the gaze characteristic may involve extracting features (e.g., using template matching, or combining a corner or feature detector with a classifier, or using a trained neural network) such as a pupil location, appearance and shape, and relate this to the position and appearance of additional features of the eye such as the iris contour (limbus), or eyelid shape and eyelid corner location. In this example illustrated by FIG. 4, the feature tracker has estimated a position of a pupil center ("estimated pupil center") 410 within the eye using a subset of image data 400 residing in a region of interest 420.

Processing image data 400 to effectuate eye tracking functionality may be effective. However, deriving image data 400 from pixel events output by event sensor 224 for the feature tracker to effectuate eye tracking functionality consumes both power and computing resources. Moreover, in some instances image data 400 may be computationally intensive for a feature tracker with limited computational resources. Therefore, to improve computational efficiency and reduce power consumption, feature tracking functionalities, such as the eye tracking functionality discussed above, may be implemented using raw pixel events output by an event sensor. That is, in various implementations tracking movement of a feature excludes deriving image data from pixel events output by the event sensor.

Figure 5:
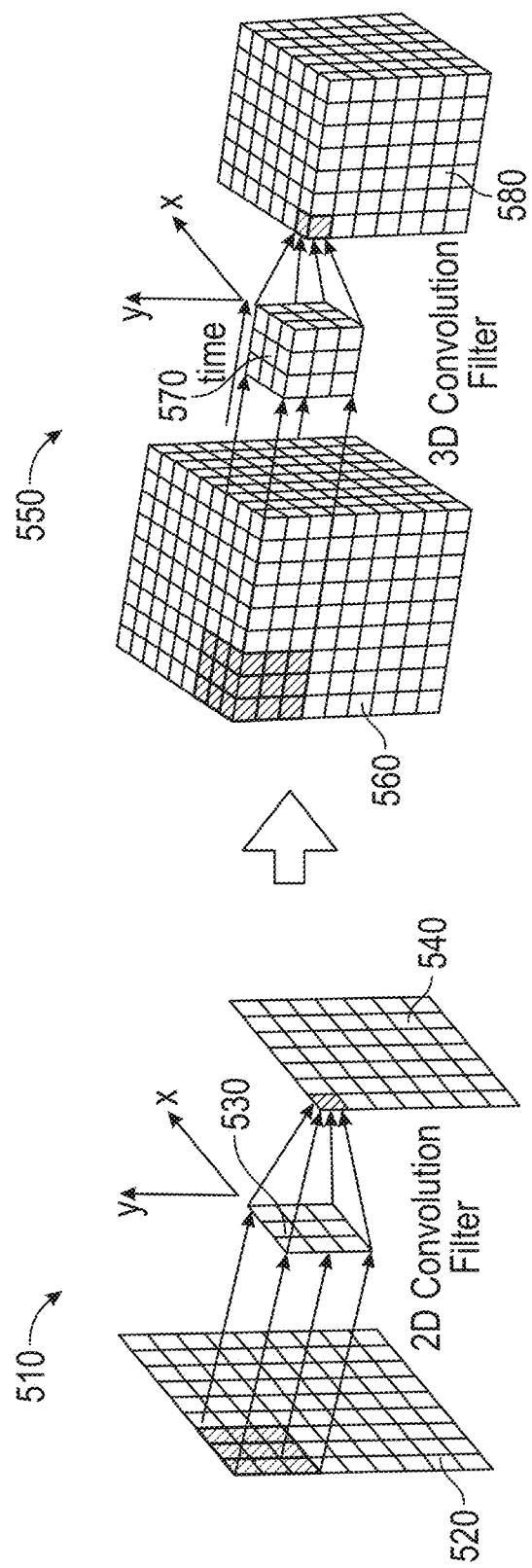
FIG. 5 illustrates an example of a stateless approach for processing pixel events output by an event sensor.

One such technique of feature tracking may involve a stateless approach of processing pixel events, as illustrated in FIG. 5. In FIG. 5, a 2-D data matrix 520 is applied as input data in a convolutional neural network ("CNN") architecture 510. In one implementation, the 2-D data matrix 520 may represent a 2-D tile of pixel events, such as tile 210 of FIG. 2. In one or more convolutional layers of the CNN architecture 510, a 2-D convolution filter 530 comprising a 2-D matrix of learnable weights is used to extract (or determine) low level features (e.g., information concerning particular pixel events) from the 2-D data matrix 520 as an output 540. To extract the low level features, the 2-D convolution filter 530 moves in 2 directions (e.g., an x-direction and a y-direction) using a sliding window technique. Stated differently, the convolution layer of the CNN architecture 510 performs a convolution operation over the 2-D data matrix 520 using the 2-D convolution filter 530 to obtain output 540. Output 540 generally represents a convolved feature map or a weighted sum of the 2-D data matrix 520 and the learnable weights of the 2-D convolution filter 530.

FIG. 5 also illustrates a temporal convolutional network ("TCN") architecture 550 that adds a third dimension (e.g., a time axis) relative to the CNN architecture 510 to extract temporal patterns of features within input data. To that end, a 3-dimensional ("3-D") data matrix 560 is applied as input data in the TCN architecture 550. In one implementation, the 3-D data matrix 560 may represent a sequence composed of multiple 2-D pixel event tiles, such as a sequence composed of tiles 210-240 of FIG. 2. Similar to CNN architecture 510, TCN architecture 550 uses a matrix of learned weights to extract low level features from the input data. However, unlike CNN architecture 510, TCN architecture 550 applies a 3-D convolution filter 570 comprising a 3-D matrix of learnable weights to extract low level features from the 3-D data matrix 560. From that application of the 3-D convolutional filter 570, the TCN architecture 550 obtains output 580.

Figure 6:
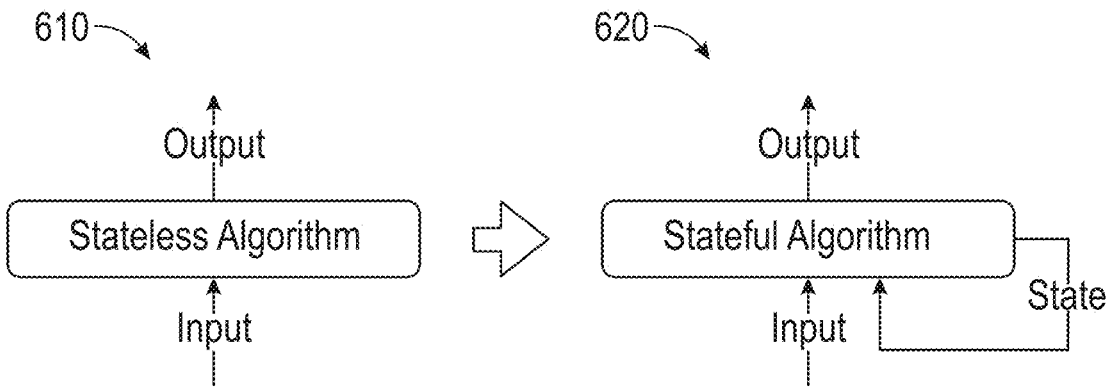
FIG. 6 illustrates a comparison between example functional block diagrams of stateless and stateful processes.

Another technique of feature tracking using raw pixel events output by an event sensor may involve a stateful approach. FIG. 6 illustrates a comparison between example functional block diagrams of a stateless process 610 and a stateful process 620. Generally, each output generated by a stateless process 610 (e.g., TCN architecture 550) is based on information obtained from current input data. Stated differently, in the stateless process 610, information only flows in a forward direction (e.g., from an input to an output). In contrast, each output generated by a stateful process (e.g., recurrent neural network ("RNN") architecture 700 of FIG. 7) is based on information obtained from current input data and information (e.g., state information) obtained in generating previous outputs. As such, in a stateful process 620, information flows in both a forward direction and a rearward direction.

Figure 7:
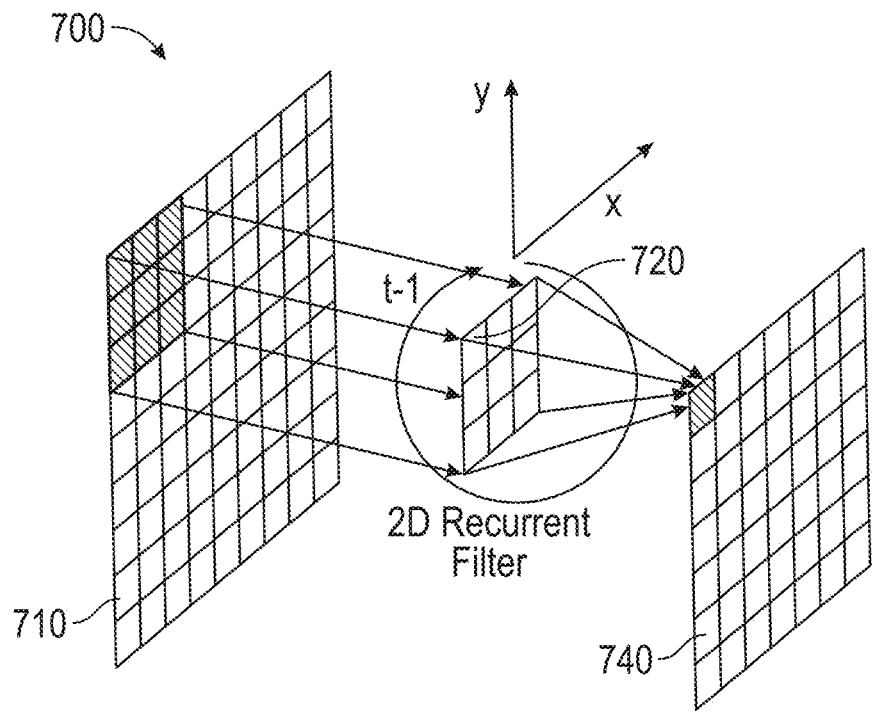
FIG. 7 illustrates an example of a stateful approach for processing pixel events output by an event sensor.

FIG. 7 illustrates an example of a stateful approach for processing pixel events output by an event sensor. Specifically, the stateful approach illustrated by FIG. 7 is an RNN architecture 700. FIG. 7 shows that similar to the CNN architecture 510 of FIG. 5, a 2-D data matrix 710 is applied as input data to the RNN architecture 700. In one implementation, the 2-D data matrix 710 may represent a 2-D tile of pixel events, such as tile 210 of FIG. 2. Unlike the CNN architecture 510, RNN architecture 700 generates output data 740 based on both the 2-D data matrix 710 and state information 720. Through state information 720, information concerning earlier input data persists in RNN architecture 700 for use in generating subsequent outputs. One skilled in the art may appreciate that other stateful approaches may be used for processing pixel events in accordance with some implementations. Examples of such other stateful approaches include: an infinite input response filter, a stochastic state estimator (e.g., a Kalman filter or a Particle filter), and the like.

Figure 8:
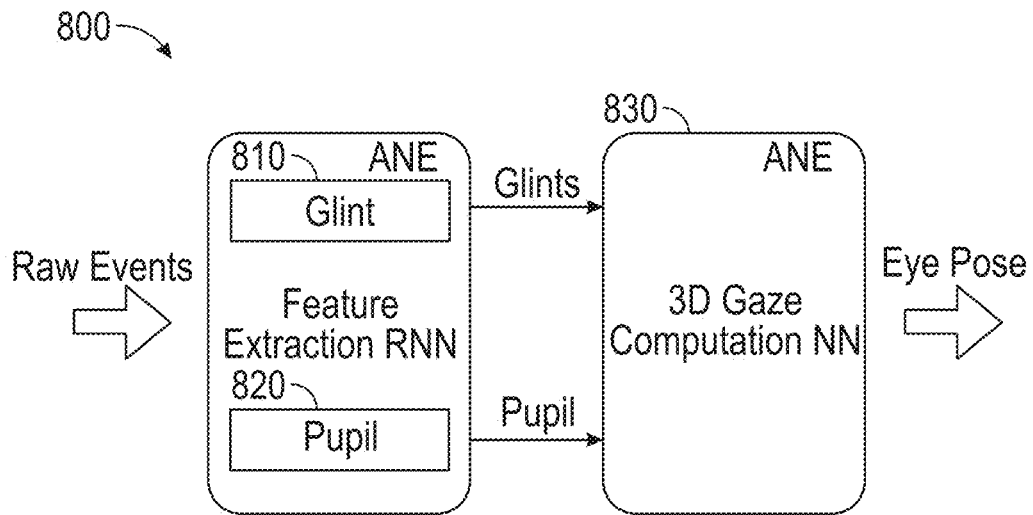
FIG. 8 illustrates an example of a stateful approach of gaze tracking using pixel events output by an event sensor.

FIG. 8 illustrates an example of a stateful approach of gaze tracking using pixel events output by an event sensor. That stateful approach of gaze tracking is represented in FIG. 8 by a gaze tracking process 800. In general, gaze tracking process 800 is configured to track a gaze of a user's eyes based on raw pixel events output by an event sensor (e.g., event sensors 100 or 224 of FIGS. 1 and 2, respectively). Gaze tracking process 800 includes a first recurrent estimation process 810, a second recurrent estimation process 820, and a gaze tracking model 830.

The first recurrent estimation process 810 is configured to determine glint-related gaze characteristics (e.g., glint locations, glint patterns, and the like) based on pixel events and previous glint-related gaze characteristics. The second recurrent estimation process 820 is configured to determine pupil-related gaze characteristics (e.g., a pupil center, a contour of a pupil, a pupil size, and the like) based on pixel events and previous pupil-related gaze characteristics. The gaze tracking model 830 is configured to determine a gaze of a user (e.g., an eye pose) based on pupil-related gaze characteristics and glint-related gaze characteristics received from the first and second recurrent estimation processes 810 and 820, respectively. The gaze tracking process 800 tracks the gaze as the gaze tracking model 830 determines updates to the gaze using subsequent pixels events output by the event sensor. In one implementation, the gaze tracking model 830 is a neural network.

In one implementation, the first recurrent estimation process 810 is omitted from the gaze tracking process 800. In this implementation, the gaze tracking model 830 is configured to determine a gaze of a user based on glint-related gaze characteristics received from the second recurrent estimation process 820. In one implementation, the second recurrent estimation process 820 is omitted from the gaze tracking process 800. In this implementation, the gaze tracking model 830 is configured to determine a gaze of a user based on pupil-related gaze characteristics received from the first recurrent estimation process 810.

One skilled in the art may recognize that by virtue of being event-driven (or frame-less), as opposed to frame-based, pixel events output by an event sensor generally do not capture a feature as a whole in some implementations. Rather, one or more bits composing a given feature disposed within a field of view of an event sensor are scattered spatially, temporally, or a combination thereof. Stated differently, pixel events corresponding to the one or more bits composing the given feature may be spatially sparse, temporally sparse, or a combination thereof. FIGS. 2 and 4 may facilitate an understanding of this point. For example, image data 400 of FIG. 4 generally includes a number of bits (or pixels—not pixel events). Collectively those number of bits composing image data 400 depict an eye of a user in a manner analogous to the Pointillism painting technique in which small, distinct dots of color are applied in patterns to form an image.

As discussed above, pixel data output by a frame-based image sensor provides absolute light intensity at each bit (or pixel). If an eye of a user is disposed within a field of view of a frame-based image sensor, the eye, each feature of the eye (e.g., pupil center), and anything else disposed within the field of view (e.g., an eyebrow) is depicted continuously in each frame of image data derived from pixel data output by that sensor. Therefore, a feature tracker configured to track a feature (e.g., the pupil center) using image data derived from such pixel data generally has continuous (e.g., at each frame) absolute light intensity information for both the one or more bits of image data depicting that feature and each of the surrounding bits of image data. In tracking a feature, the feature tracker has access to pixel data that captures the feature as a whole at each point in time. That is, the one or more bits of image data corresponding to the feature used by that feature tracker are continuous both spatially and temporally.

In contrast, tracking a feature using pixel events output by an event sensor involves reconstructing the feature itself from data which is spatially sparse, temporally sparse, or both, in various implementations. For example, an event sensor may output 2-D tiles of pixel events (e.g., the 2-D tiles of pixel events illustrated in FIG. 2) to the gaze tracking process 800. If each tile among tiles 210-240 of FIG. 2 correspond to the eye depicted in image data 400 of FIG. 4 at different time periods, tracking a feature of that eye (e.g., a pupil center) may involve the gaze tracking process 800 identifying which pixel event (if any) correspond to the feature as each tile is received.

Figure 11:
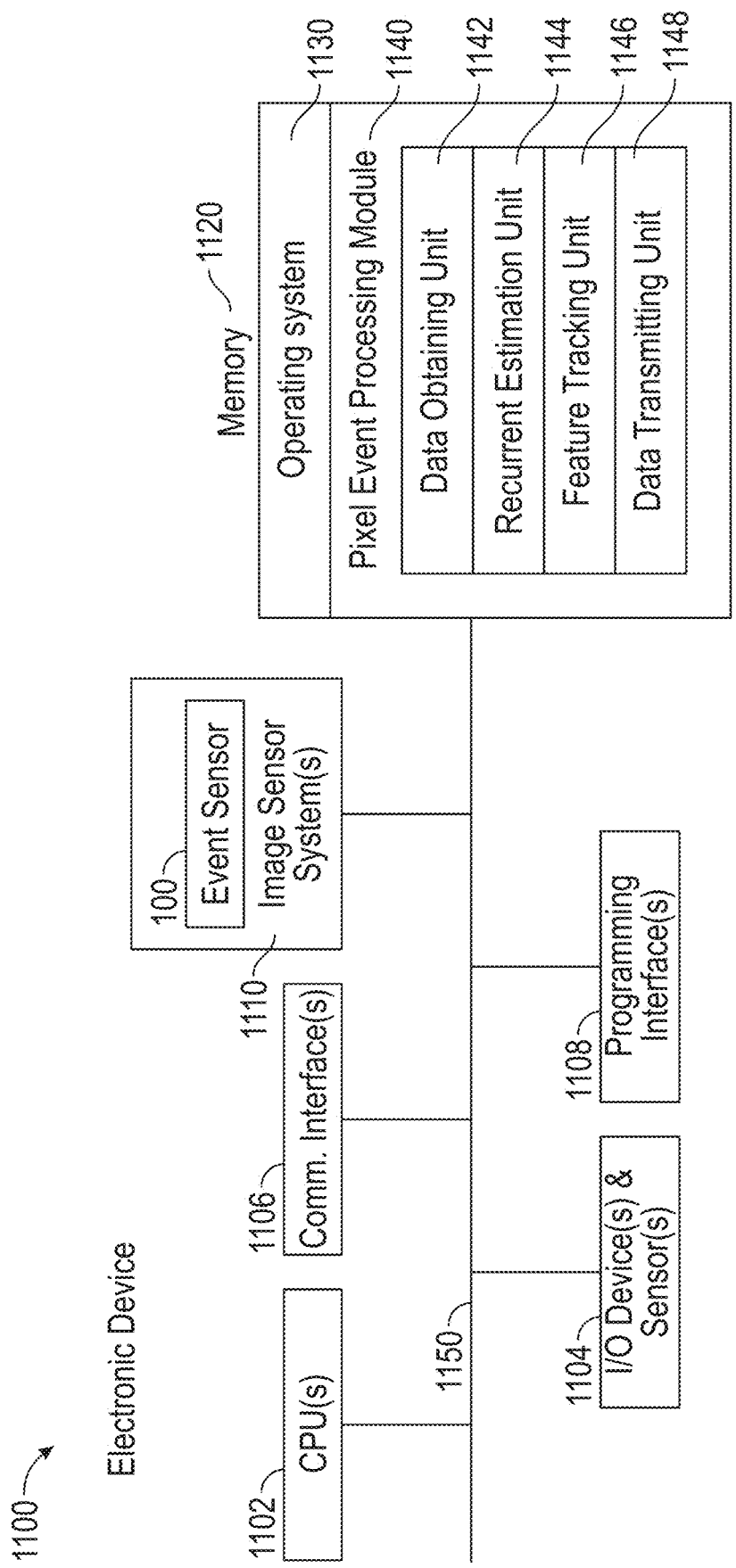
FIG. 11 is a block diagram of an example electronic device, in accordance with some implementations.

In various implementations, information obtained from tracking a gaze of a user may be used to control operation of an electronic device (e.g., head-mounted device 300 or electronic device 1100 of FIGS. 3 and 11, respectively). For example, content presented on a display of the electronic device may be modified based on the tracking of the gaze. As another example, an input for a computing process effectuated using computing resources of the electronic device or a remote computing device on behalf of the electronic device may be generated based on information obtained from tracking a gaze of a user.

Figure 9:
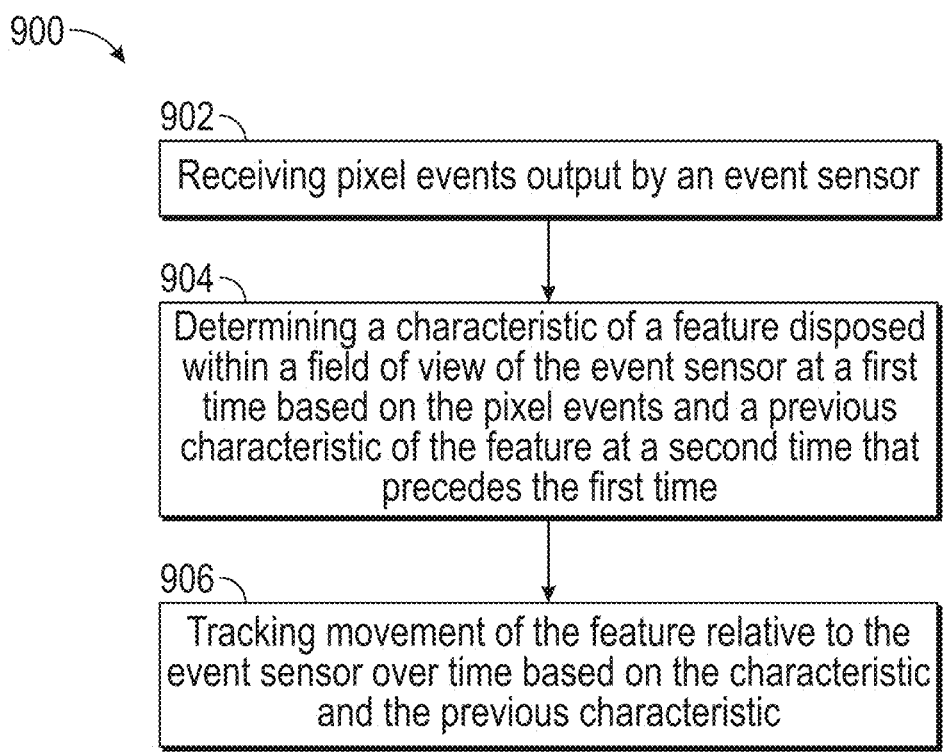
FIG. 9 is a flow-chart illustrating an example of a method for processing events output by an event sensor using recurrent state estimation.

FIG. 9 is a flow-chart illustrating an example of a method 900 of processing events output by an event driven sensor using recurrent state estimation. In one implementation, method 900 is effectuated by pixel event processing module 1140 of FIG. 11. At block 902, method 900 includes receiving pixel events output by an event sensor that correspond to a feature disposed within a field of view of the event sensor. Each respective pixel event among the pixel events output by the event sensor is generated in response to a specific pixel within a pixel array of the event sensor detecting a change in light intensity that exceeds a comparator threshold. In one implementation, the pixel events are output by the event sensor as 2-D tiles of pixel events (e.g., the 2-D tiles of pixel events depicted in FIG. 4). In one implementation, the pixel events are output from the event sensor as a list of pixel events. In one implementation, the pixel events are spatially and temporally sparse.

At block 904, method 900 includes determining a characteristic of the feature at a first time based on the pixel events and a previous characteristic of the feature at a second time that precedes the first time. In one implementation, the previous characteristic is determined at the second time based on earlier pixel events output by the event sensor and an earlier characteristic of the feature determined at a third time that precedes the second time.

In one implementation, the characteristic of the feature is determined with a recurrent estimation process. In one implementation, determining the characteristic of the feature includes providing the pixel events as raw pixel events at an input of the recurrent estimation process. In one implementation, the recurrent estimation process is configured to retain state information derived from earlier pixel events output by the event sensor. In one implementation, the recurrent estimation process is a recurrent neural network, an infinite input response filter, or a stochastic state estimator. In one implementation, the stochastic state estimator is a Kalman filter or a Particle filter.

At block 906, method 900 includes tracking movement of the feature relative to the event sensor over time based on the characteristic and the previous characteristic. In one implementation, tracking the movement of the feature excludes deriving image data from the pixel events. In one implementation, tracking movement of the feature includes reconstructing the feature from the pixel events. In one implementation, method 900 further includes determining updated characteristics of the feature as subsequent pixel events are output by the event sensor. In one implementation, method 900 further includes generating input for a computing process based on the movement of the feature relative to the event sensor. In one implementation, method 900 further includes displaying movement of a graphical indicator on a display based on the movement of the feature. In one implementation, method 900 further includes pulsing an optical source at a defined frequency to cause pixels within the pixel array to generate event data at a rate that is proportional to the defined frequency.

Figure 10:
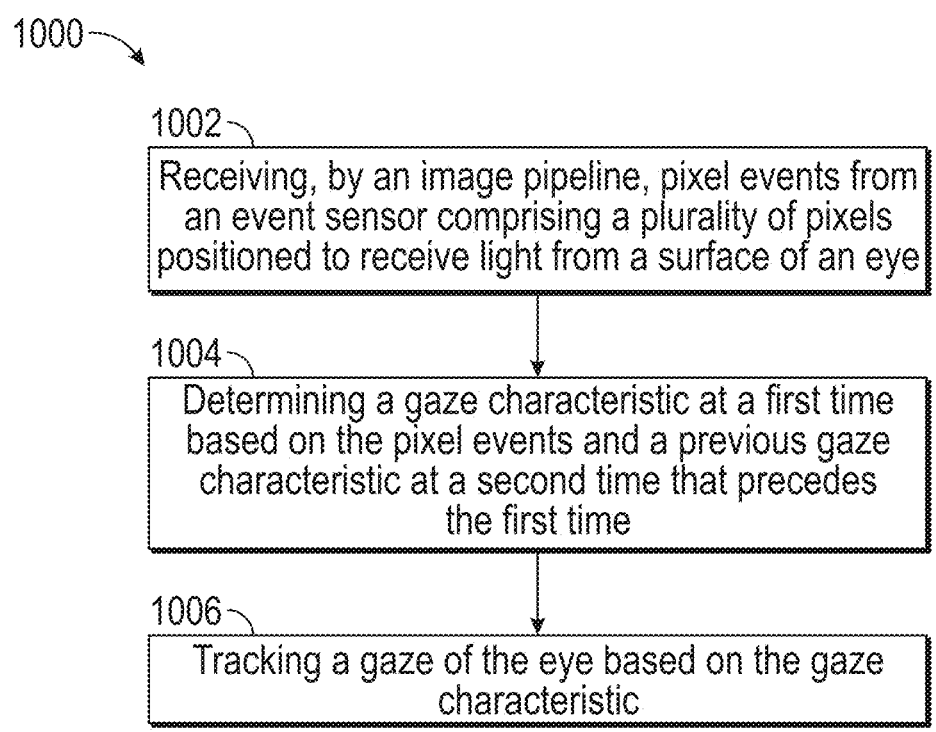
FIG. 10 is a flow-chart illustrating another example of a method for processing events output by an event sensor using recurrent state estimation.

FIG. 10 is a flow-chart illustrating another example of a method 1000 of processing events output by an event driven sensor using recurrent state estimation. In one implementation, method 1000 is effectuated by pixel event processing module 1140 of FIG. 11. At block 1002, method 1000 includes receiving, by an image pipeline, pixel events output by an event sensor comprising a plurality of pixels positioned to receive light from a surface of an eye. Each respective pixel event among the pixel events output by the event sensor is generated in response to a specific pixel among the plurality of pixels detecting a change in light intensity that exceeds a comparator threshold. In one implementation, the pixel events correspond to specular reflections of light from the surface of the eye. In one implementation, the pixel events correspond to infrared light emitted by an optical source towards the surface of the eye.

At block 1004, method 1000 includes determining a gaze characteristic at a first time based on the pixel events and a previous gaze characteristic at a second time that precedes the first time. In one implementation, the gaze characteristic is indicative of a center of a pupil of the eye, a contour of the pupil of the eye, or a glint generated using a light emitting diode.

In one implementation, the gaze characteristic is determined with a recurrent estimation process. In one implementation, determining the gaze characteristic includes providing the pixel events as raw pixel events at an input of the recurrent estimation process. In one implementation, the recurrent estimation process is configured to retain state information derived from earlier pixel events output by the event sensor. In one implementation, the recurrent estimation process is a recurrent neural network, an infinite input response filter, or a stochastic state estimator. In one implementation, the stochastic state estimator is a Kalman filter or a Particle filter.

At block 1006, method 1000 includes tracking a gaze of the eye based on the gaze characteristic. In one implementation, the gaze characteristic is a first gaze characteristic indicative of a center of a pupil of the eye or a contour of the pupil of the eye. In one implementation, tracking the gaze of the eye comprises providing the first gaze characteristic and a second gaze characteristic corresponding to one or more glint locations as input to a gaze tracking model configured to determine a pose of the eye based on the first gaze characteristic and the second gaze characteristic. In one implementation, the gaze tracking model is a neural network.

In one implementation, method 1000 further includes modifying content presented on a display based on the tracking of the gaze. In one implementation, pulsing the optical source at the defined frequency causes pixels within the first subset of pixels to generate event data at a rate that is proportional to the defined frequency.

In one implementation, method 900 or method 1000 are performed by processing logic, including hardware, firmware, software, or a combination thereof. In one implementation, method 900 or method 1000 are performed by a processor executing code stored in a non-transitory computer-readable medium (e.g., a memory).

FIG. 11 is a block diagram of an example electronic device 1100 in accordance with some implementations. While certain specific features are illustrated, those skilled in the art will appreciate from the subject matter disclosed herein that various other features have not been illustrated for the sake of brevity, and so as not to obscure more pertinent aspects of the implementations disclosed herein. To that end, as a non-limiting example, in some implementations electronic device 1100 includes one or more processors 1102 (e.g., microprocessors, ASICs, FPGAs, GPUs, CPUs, processing cores, or the like), one or more I/O devices 1104, one or more communication interfaces 1106 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 1108, one or more image sensor systems 1110, a memory 1120, and one or more communication buses 1150 for interconnecting these and various other components. In brief, a GPU can include a specialized electronic circuit designed to rapidly manipulate and alter memory to accelerate the creation of images in a frame buffer. A GPU can be present on a video card, or it can be embedded on a motherboard or—in certain CPUs—on the CPU die.

In some implementations, the one or more I/O devices and sensors 1104 are configured to provide a human to machine interface exchanging commands, requests, information, data, and the like, between electronic device 1100 and a user. To that end, the one or more I/O devices 1104 can include, but are not limited to, a keyboard, a pointing device, a microphone, a joystick, and the like. In some implementations, the one or more I/O devices and sensors 1104 are configured to detect or measure a physical property of an environment proximate to electronic device 1100. To that end, the one or more I/O devices 1104 can include, but are not limited to, an IMU, an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more communication interfaces 1106 can include any device or group of devices suitable for establishing a wired or wireless data or telephone connection to one or more networks. Non-limiting examples of a network interface device include an Ethernet network adapter, a modem, or the like. A device can transmit messages as electronic or optical signals.

In some implementations, the one or more programming (e.g., I/O) interfaces 1108 are configured to communicatively couple the one or more I/O devices with other components of electronic device 1100. As such, the one or more programming interfaces 1108 are capable of accepting commands or input from a user via the one or more I/O devices 1104 and transmitting the entered input to the one or more processors 1102.

In some implementations, the one or more image sensor systems 1406 are configured to generate and output data regarding incident illumination or light intensity. In some implementations, the one or more image sensor systems 1110 comprise an event driven sensor configured to generate and output data regarding changes in light intensity at each pixel of the event driven sensor. Examples of suitable sensors for implementing an event driven sensor of the one or more image sensor systems 1110 may include event sensors 100 or 224 of FIGS. 1 and 2, respectively.

In some implementations, the one or more image sensor systems 1110 further comprise a frame-based image sensor configured to generate and output data regarding absolute light intensity at each pixel of the frame-based image sensor. Examples of suitable sensors for implementing a frame-based image sensor of the one or more image sensor systems 1110 may include one or more RGB camera (e.g., with a complimentary metal-oxide-semiconductor ("CMOS") image sensor or a charge-coupled device ("CCD") image sensor), monochrome camera, IR camera, or the like.

The memory 1120 can include any suitable computer-readable medium. A computer readable storage medium should not be construed as transitory signals per se (e.g., radio waves or other propagating electromagnetic waves, electromagnetic waves propagating through a transmission media such as a waveguide, or electrical signals transmitted through a wire). For example the memory 1120 may include high-speed random-access memory, such as DRAM, SRAM, DDR RAM, or other random-access solid-state memory devices. In some implementations, the memory 1120 includes non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 comprises a non-transitory computer readable storage medium. Instructions stored in the memory 1120 may be executed by the one or more processors 1102 to perform a variety of methods and operations, including the technique for enriching locally-sourced image data described in greater detail below.

In some implementations, the memory 1120 or the non-transitory computer readable storage medium of the memory 1120 stores the following programs, modules and data structures, or a subset thereof including an optional operating system 1130 and a pixel event processing module 1140. The operating system 1130 includes procedures for handling various basic system services and for performing hardware dependent tasks. In some implementations, the pixel event processing module 1140 is configured to process pixel events output by an event driven sensor (e.g., event sensors 100 or 224 of FIGS. 1 and 2, respectively) using recurrent state estimation. In one implementation, the pixel event processing module 1140 interacts with components of an image pipeline that receives pixel events from an event driven sensor. To that end, in various implementations, the pixel event processing module 1140 includes a data obtaining unit 1142, a recurrent estimation unit 1144, a feature tracking unit 1146, and a data transmitting unit 1148.

In some implementations, the data obtaining unit 1142 is configured to obtain data (e.g., event data, sensor data, location data, etc.) from one or more devices external to electronic device 1100. To that end, in various implementations, the data obtaining unit 1142 includes instructions and/or logic therefor, and heuristics and metadata therefor.

In some implementations, the recurrent estimation unit 1144 includes one or more recurrent estimation processes configured to determine a characteristic of feature at a first time based on pixel events output by an event driven sensor (e.g., event sensors 100 or 224 of FIGS. 1 and 2, respectively) and a previous characteristic of the feature at a second time preceding the first time. To that end, in various implementations, the recurrent estimation unit 1144 includes instructions or logic therefor, and heuristics and metadata therefor.

In some implementations, the feature tracking unit 1146 is configured to track movement of a feature (e.g., a gaze corresponding to an eye of a user) based on characteristics received from the recurrent estimation unit 1144. To that end, in various implementations, the feature tracking unit 1146 includes instructions or logic therefor, and heuristics and metadata therefor.

In some implementations, the data transmitting unit 1148 is configured to transmit data (e.g., event data, sensor data, location data, etc.) to one or more devices external to electronic device 1100. To that end, in various implementations, the data transmitting unit 1148 includes instructions or logic therefor, and heuristics and metadata therefor.

Although the data obtaining unit 1142, the recurrent estimation unit 1144, the feature tracking unit 1146, and the data transmitting unit 1148 are shown as residing on a single device (e.g., electronic device 1100), it should be understood that in other implementations, any combination of the data obtaining unit 1142, the recurrent estimation unit 1144, the feature tracking unit 1146, and the data transmitting unit 1148 may be located in separate computing devices.

FIG. 11 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   receiving pixel events output by an event sensor, each respective pixel event generated in response to a specific pixel within a pixel array of the event sensor detecting a change in light intensity that exceeds a comparator threshold, the pixel events corresponding to a feature disposed within a field of view of the event sensor;

determining a characteristic of the feature at a first time based on the pixel events and a previous characteristic of the feature at a second time that precedes the first time, wherein the previous characteristic of the feature at the second time was a result of a previous characteristic determination based on previous pixel events, wherein the characteristic is determined by inputting the pixel events output by the event sensor to a neural network that produces output corresponding to the characteristic based on the pixel events and state information corresponding to the previous characteristic, the neural network comprising a filter configured to persist the state information from earlier input data for use in generating subsequent outputs; and tracking movement of the feature relative to the event sensor over time based on the characteristic and the previous characteristic.

2. The method of claim 1, wherein tracking the movement of the feature excludes deriving image data from the pixel events.

3. The method of claim 1, wherein the previous characteristic is determined at the second time based on earlier pixel events output by the event sensor and an earlier characteristic of the feature determined at a third time that precedes the second time.

4. The method of claim 1, further comprising:
determining updated characteristics of the feature as subsequent pixel events are output by the event sensor.

5. The method of claim 1, further comprising:
generating input for a computing process based on the movement of the feature relative to the event sensor.

6. The method of claim 1, further comprising:
pulsing an optical source at a defined frequency to cause pixels within the pixel array to generate event data at a rate that is proportional to the defined frequency.

7. The method of claim 1, wherein the pixel events corresponding to the feature are spatially and temporally sparse, and wherein tracking the movement of the feature includes: reconstructing the feature from the pixel events output by the event sensor.

8. A system comprising:
a processor;
an image pipeline; and
a computer-readable storage medium comprising instructions that upon execution by the processor cause the system to perform operations, the operations comprising:
receiving, by the image pipeline, pixel events output by an event sensor comprising a plurality of pixels positioned to receive light from a surface of an eye, each respective pixel event generated in response to a specific pixel within a pixel array of the event sensor detecting a change in light intensity that exceeds a comparator threshold;
determining a gaze characteristic at a first time based on the pixel events and a previous gaze characteristic at a second time that precedes the first time, wherein the previous gaze characteristic of the feature at the second time was a result of a previous gaze characteristic determination based on previous pixel events, wherein the gaze characteristic is determined by inputting the pixel events output by the event sensor to a neural network that produces output corresponding to the gaze characteristic based on the pixel events and state information corresponding to the previous gaze characteristic, the neural network comprising a filter configured to persist the state information from earlier input data for use in generating subsequent outputs; and tracking a gaze of the eye based on the gaze characteristic.

9. The system of claim 8, wherein the pixel events correspond to specular reflections of light from the surface of the eye.

10. The system of claim 8, wherein the pixel events correspond to infrared light emitted by an optical source towards the surface of the eye.

11. The system of claim 8, wherein the gaze characteristic is indicative of a center of a pupil of the eye, a contour of the pupil of the eye, or a glint generated using a light emitting diode.

12. The system of claim 8, wherein the instructions, when executed, further cause the system to perform additional operations, the additional operations comprising:
modifying content presented on a display based on the tracking of the gaze.

13. The system of claim 8, wherein the gaze characteristic is a first gaze characteristic indicative of a center of a pupil of the eye or a contour of the pupil of the eye, and wherein tracking the gaze of the eye further comprises:
providing the first gaze characteristic and a second gaze characteristic corresponding to one or more glint locations as input to a gaze tracking model configured to determine a pose of the eye based on the first gaze characteristic and the second gaze characteristic.

14. The system of claim 13, wherein the gaze tracking model is a neural network.

15. A non-transitory computer-readable storage medium storing program instructions computer-executable on a computer to perform operations comprising:
receiving pixel events output by an event sensor comprising a plurality of pixels positioned to receive light from a scene disposed within a field of view of the event sensor, each respective pixel event generated in response to a specific pixel within the plurality of pixels detecting a change in light intensity that exceeds a comparator threshold;
determining, with a recurrent estimation process, a characteristic of a feature within the field of view at a first time based on the pixel events and a previous characteristic of the feature at a second time that precedes the first time, wherein the previous characteristic of the feature at the second time was a result of a previous characteristic determination based on previous pixel events, wherein the characteristic is determined by inputting the pixel events output by the event sensor to a neural network that produces output corresponding to the characteristic based on the pixel events and state information corresponding to the previous characteristic, the neural network comprising a filter configured to persist the state information from earlier input data for use in generating subsequent outputs; and
tracking movement of the feature within the field of view using the characteristic.

16. The non-transitory computer-readable storage medium of claim 15, wherein the recurrent estimation process utilizes a recurrent neural network.

17. The non-transitory computer-readable storage medium of claim 15, wherein determining the characteristic of the feature comprises:
providing the pixel events as raw pixel events at an input of the recurrent estimation process.

18. The non-transitory computer-readable storage medium of claim 15, wherein the program instructions are computer-executable on the computer to perform operations comprising:

determining updated characteristics of the feature as subsequent pixel events are output by the event sensor.

19. The non-transitory computer-readable storage medium of claim 15, wherein the recurrent estimation process is configured to retain state information derived from earlier pixel events output by the event sensor.

20. The method of claim 1, wherein a 2-D data matrix comprising the pixel events output by the event sensor is applied as input data to the neural network.

21. The method of 1, wherein the filter is a 2D recurrent filter.

22. The method of 1, wherein the filter is a 3D recurrent filter.

* * * * *